United States Patent
Celentano et al.

(10) Patent No.: US 8,027,288 B2
(45) Date of Patent: Sep. 27, 2011

(54) REDUCING BEACON SLOT ACQUISITION TIME IN DISTRIBUTED MEDIA ACCESS CONTROL NETWORK

(75) Inventors: Ulrico Celentano, Oulu (FI); Leonardo Goratti, Oulu (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 1445 days.

(21) Appl. No.: 11/111,869

(22) Filed: Apr. 22, 2005

(65) Prior Publication Data

US 2006/0239220 A1   Oct. 26, 2006

(51) Int. Cl.
*H04W 4/00* (2009.01)

(52) U.S. Cl. .................................. 370/328; 370/455

(58) Field of Classification Search .............. 370/338, 370/348, 349, 445, 328; 455/63, 426, 454, 455/462, 464, 552, 553
See application file for complete search history.

(56) References Cited

U.S. PATENT DOCUMENTS

| 2003/0231607 | A1* | 12/2003 | Scanlon et al. | 370/338 |
|---|---|---|---|---|
| 2004/0218683 | A1* | 11/2004 | Batra et al. | 375/261 |
| 2005/0249173 | A1* | 11/2005 | Salokannel et al. | 370/338 |
| 2006/0002349 | A1* | 1/2006 | Demirhan | 370/338 |
| 2006/0092909 | A1* | 5/2006 | Ho | 370/348 |
| 2008/0259877 | A1* | 10/2008 | Habetha | 370/336 |

FOREIGN PATENT DOCUMENTS

| JP | 2007-531374 | 11/2001 |
|---|---|---|
| JP | 2007-525891 | 9/2007 |
| WO | WO 2005/076543 | 8/2005 |
| WO | WO 2005/094007 | 10/2005 |

OTHER PUBLICATIONS

Jay O'Conor and Ron Brown; "Distributed Medium Access Control (MAC) For Wireless Networks"; MBOA Draft MAC Standard 0.95; Apr. 11, 2005; pp. 1-152.
International Search Report dated Sep. 12, 2006.
Hiertz et al., "Multiband OFDM Alliance—The Next Generation of Wireless Personal Area Networks", Advances in Wired and Wireless Communication, 2005, IEEE/Sarnoff Symposium, pp. 208-214, Apr. 18-19, 2005.
ECMA International, Standard ECMA-368 1st Edition, Dec. 2005, "High Rate Ultra Wideband PHY and MAC Standard", pp. 187-193, Retrieved at http://www.ecma-international.org/publications/files/ECMA-ST/ECMA-368.pdf.
Tavli et al., "MH-TRACE: Multi-Hop Time Reservation Using Adaptive Control for Energy Efficiency", Military Communications Conference, 2003, MILCOM 2003, IEEE, vol. 2, pp. 1292-1297, Oct. 13-16, 2003.
Christian Namislo, "Analysis of Mobile Radio Slotted ALOHA Networks," IEEE Journal on Selected Areas on Communications, vol. 2, Issue 4, pp. 583-588, Jul. 1984.
Office Action issued by the Korean Patent Office for Korean Patent Application No. 2007-7023987 dated Sep. 23, 2009.
Japanese Office Action dated Jul. 5, 2010 for Japanese Patent Application No. 2008-507185.

* cited by examiner

*Primary Examiner* — Ricky Ngo
*Assistant Examiner* — David Oveissi
(74) *Attorney, Agent, or Firm* — Locke Lord Bissell & Liddell (57) ABSTRACT

A first beacon slot is selected by a wireless communications device in a repeating time interval. Accordingly, beacons of the wireless communications device are transmitted during the first beacon slot. However, when an announcement of the first beacon slot selection of step is not received from a remote device within a predetermined amount of time, a second beacon slot is selected. Upon this selection, beacons of the wireless communications device are transmitted during the second beacon slot instead of the first beacon slot.

21 Claims, 9 Drawing Sheets

| Element ID 302 | Length ID 304 | BP Length 306 | Beacon Slot Information 308 | Device Addresses 310 |
|---|---|---|---|---|

REDUCING BEACON SLOT ACQUISITION TIME IN DISTRIBUTED MEDIA ACCESS CONTROL NETWORK

FIELD OF THE INVENTION

The present invention relates to wireless communications. More particularly, the present invention relates to techniques that enhance network join operations in distributed media access control network environments.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

A high rate physical layer (PHY) standard is currently being selected for IEEE 802.15.3a. The existing IEEE 802.15.3 media access control layer (MAC) is supposed to be used as much as possible with the selected PHY. Currently, there are two remaining PHY candidates. One of these candidates is based on frequency hopping application of orthogonal frequency division multiplexing (OFDM). The other candidate is based on M-ary Binary offset Keying. The OFDM proposal is called Multiband OFDM (MBO). Moreover, in order to further develop the OFDM proposal outside of the IEEE, a new alliance has been formed called the MultiBand OFDM Alliance (MBOA).

MBO utilizes OFDM modulation and frequency hopping. MBO frequency hopping may involve the transmission of each of the OFDM symbols at various frequencies according to pre-defined codes, such as Time Frequency Codes (TFCs). Time Frequency Codes can be used to spread interleaved information bits across a larger frequency band.

Presently, there is an interest within the MBOA to create a Medium Access Control (MAC) layer that would be used with the OFDM physical layer instead of the IEEE 802.15.3 MAC layer. A current version of the MBOA MAC involves a group of wireless communications devices (referred to as a beaconing group) that are capable of communicating with each other. The timing of beaconing groups is based on a repeating pattern of "superframes" in which the devices may be allocated communications resources.

MAC layers govern the exchange among devices of transmissions called frames. A MAC frame may have various portions. Examples of such portions include frame headers and frame bodies. A frame body includes a payload containing data associated with higher protocol layers, such as user applications. Examples of such user applications include web browsers, e-mail applications, messaging applications, and the like.

In addition, MAC layers govern the allocation of resources. For instance, each device requires an allocated portion of the available communication bandwidth to transmit frames. The current MBOA MAC proposal provides for the allocation of resources to be performed through communications referred to as beacons. Beacons are transmissions that devices use to convey non-payload information. Each device in a beaconing group is assigned a portion of bandwidth to transmit beacons.

Such transmissions allow the MBOA MAC to operate according to a distributed control approach, in which multiple devices share MAC layer responsibilities. Accordingly, the current MBOA MAC Specification (version 0.95, Apr. 11, 2005) provides various channel access mechanisms that allow devices to allocate portions of the transmission medium for communications traffic. These mechanisms include a protocol called the distributed reservation protocol (DRP), and a protocol called prioritized contention access (PCA).

This distributed control approach allows for devices a certain degree of autonomy in joining MBOA networks. While this may be efficient in certain circumstances, it may cause contention and inaccessibility in certain high demand scenarios. Accordingly, an improvement to the existing solution is needed.

SUMMARY OF THE INVENTION

The present invention provides a method, apparatus, and computer program product that selects a first beacon slot in a repeating time interval, and transmits beacons of the wireless communications device during the first beacon slot. However, when an announcement of the first beacon slot selection of step is not received from a remote device within a predetermined amount of time, a second beacon slot is selected. Upon this selection, beacons of the wireless communications device are transmitted during the second beacon slot instead of the first beacon slot.

The present invention allows for devices to efficiently join a network. Further features an advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
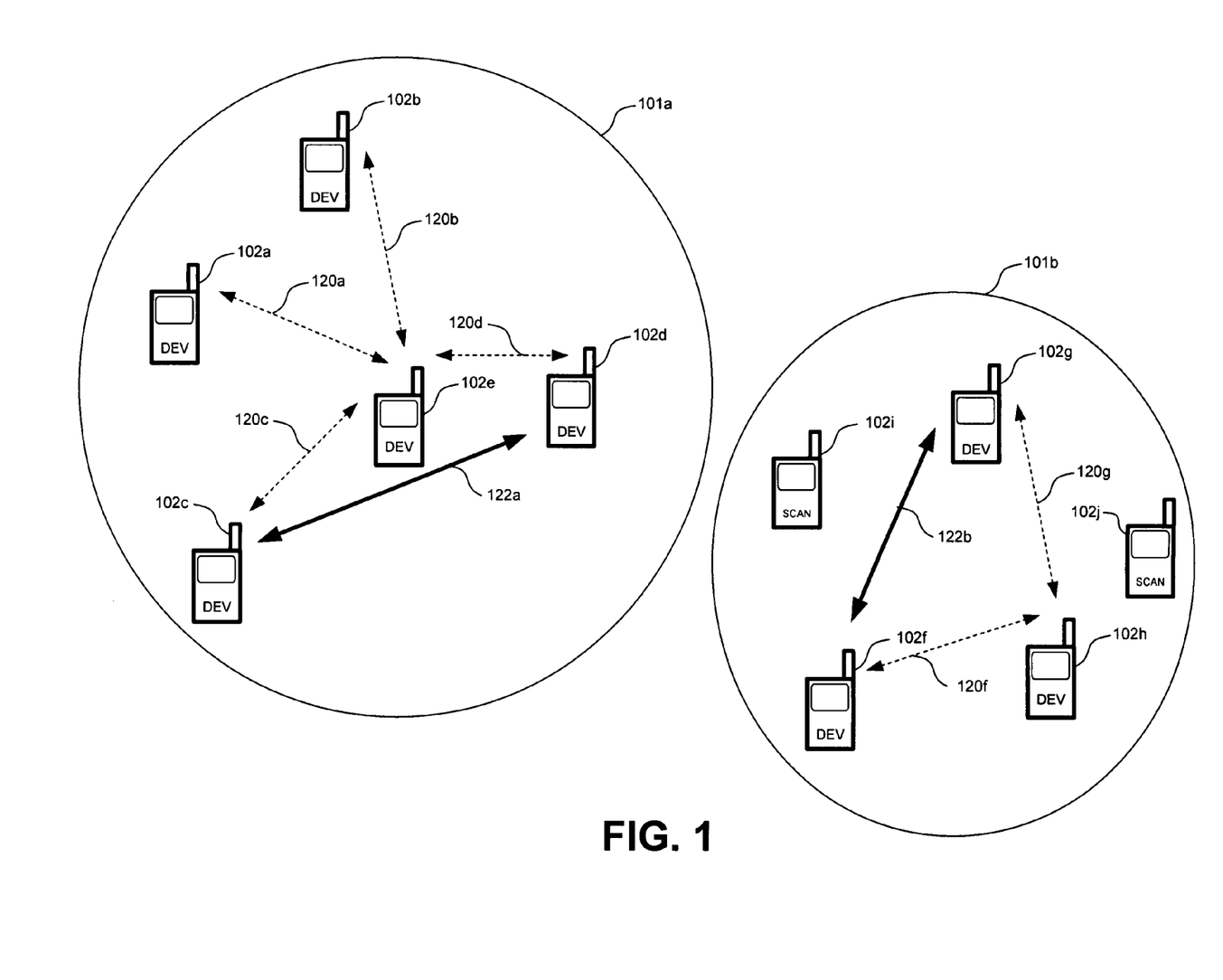
FIG. 1 is a diagram of an exemplary operational environment in which the principles of the present invention may be employed.

Before describing the invention in detail, it is first helpful to describe an environment in which the present invention may be employed. Accordingly, FIG. 1 is a diagram of an exemplary operational environment in which the principles of the present invention may be employed. This environment includes multiple beaconing groups 101, each having a plurality of devices 102. For instance, FIG. 1 shows a beaconing group 101a, which includes member devices (DEVs) 102a-e. FIG. 1 also shows a beaconing group 101b, which includes DEVs 102f, 102g, 102h, and 102k (device 102k is operating in a hibernating mode).

In beaconing group 101a, each of DEVs 102a-d may communicate with DEV 102e across a corresponding link 120. For instance, FIG. 1 shows DEV 102a communicating with DEV 102e across a link 120a. In addition, in beaconing group 101a, each of devices 102a-e may communicate with each other directly. For instance, FIG. 1 shows DEVs 102c and 102d communicating via a direct link 122a.

In beaconing group 101b, each of DEVs 102f and 102g may communicate with DEV 102h across a corresponding link 120. For instance, DEV 102f communicates with DEV 102h across a link 120f, while DEV 102g communicates with DEV 102h across a link 120g. DEVs 102f and 102g in beaconing group 101b may also communicate with each other. For example, FIG. 1 shows DEVs 102f and 102g communicating across a link 122b.

Each of links 122 and 120 may employ various frequency hopping patterns. These patterns may include, for example, one or more Time Frequency Codes (TFCs). In embodiments of the present invention, each beaconing group 101 employs a particular frequency hopping pattern. These patterns may either be the same or different.

In addition, FIG. 1 also shows devices 102i and 102j, which do not belong to either of the beacon groups. Instead, both devices 102i and 102j may be willing to join to beacon group 101b simultaneously. For example, if these devices, when joining beacon group 101b transmit their beacon transmissions during the same beacon slot, a collision may occur. This may lead to unnecessary delays for the devices 102i and 102j to join the beacon group 101b. The present invention provides improvements to network joining operations in such events.

Figure 2:
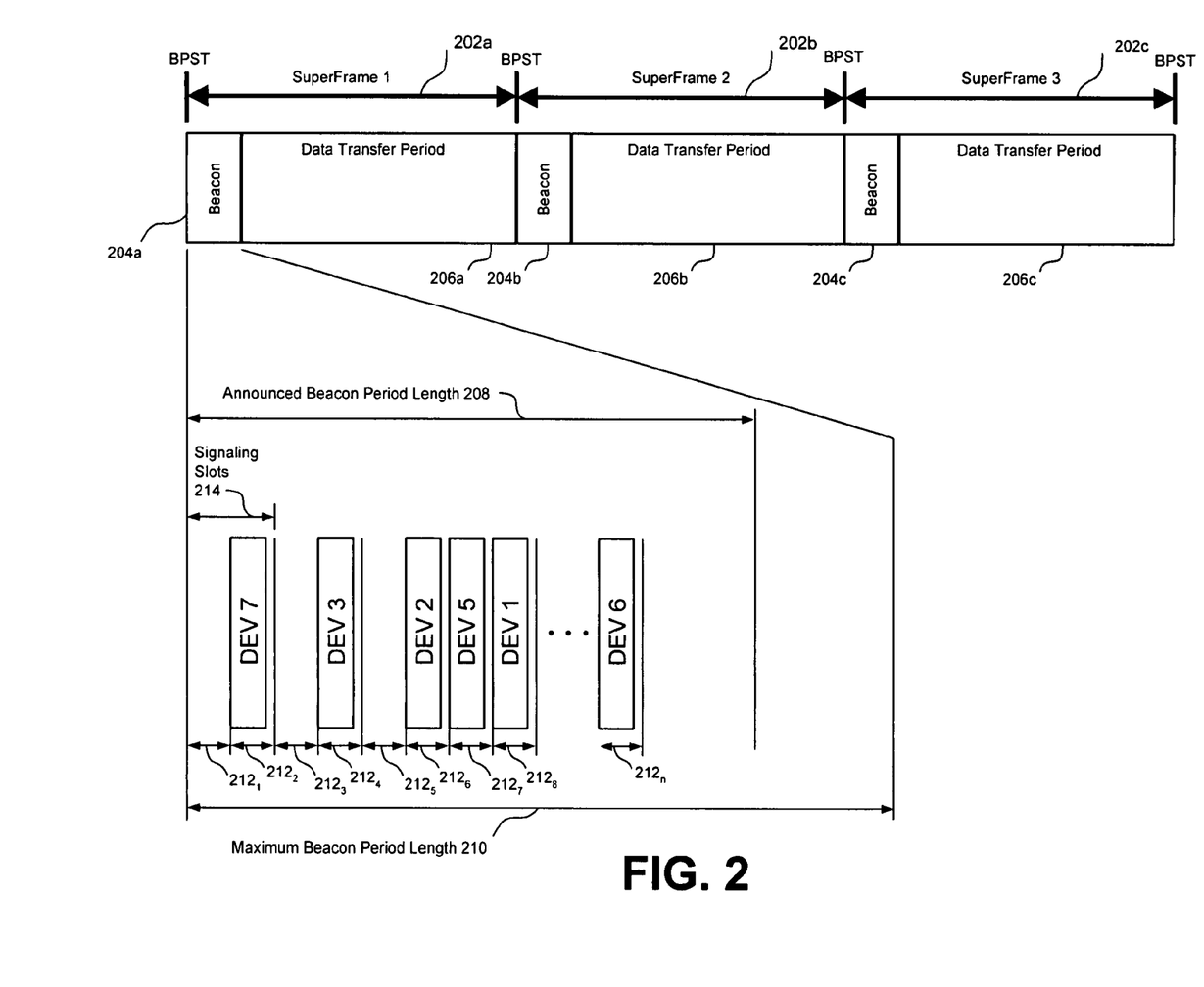
FIG. 2 is a diagram showing an exemplary MBOA superframe format.

Transmissions of beaconing groups 101a and 101b are each based on a repeating pattern called a superframe. Accordingly, FIG. 2 is a diagram showing an exemplary MBOA superframe format. In particular, FIG. 2 shows a frame format having superframes 202a, 202b, and 202c. As shown in FIG. 2, superframe 202b immediately follows superframe 202a, and superframe 202c immediately follows superframe 202b.

Each superframe 202 includes a beacon period 204 and a data transfer period 206. Beacon periods 204 convey transmissions from each of the active devices in the beaconing group. As shown in FIG. 2, beacon period 204a has an announced length 208, which is less than or equal to a maximum beacon period length 210 (also referred to as mMaxBPLength 210).

Multiple beacon slots 212 exist during beacon period. During these slots, devices may transmit their respective beacons. Accordingly, each of these slots may correspond to a particular device in the beaconing group. For instance, FIG. 2 shows a device 7 transmitting in slot $212_2$, a device 3 in slot $212_4$, a device 2 in slot $212_6$, a device 5 in slot $212_7$, a device 8 in slot $212_8$, and a device 6 in slot $212_n$.

The first two beacon slots (i.e., slots $212_1$ and $212_2$) are referred to as signaling slots. These slots are used, for example, to indicate changes in beacon period length. Accordingly, in certain situations, devices occupying the highest beacon slots may repeat their beacon transmissions in these slots. This repetition of beacon transmissions is performed in the same beacon period or in the same superframe.

Figure 3:
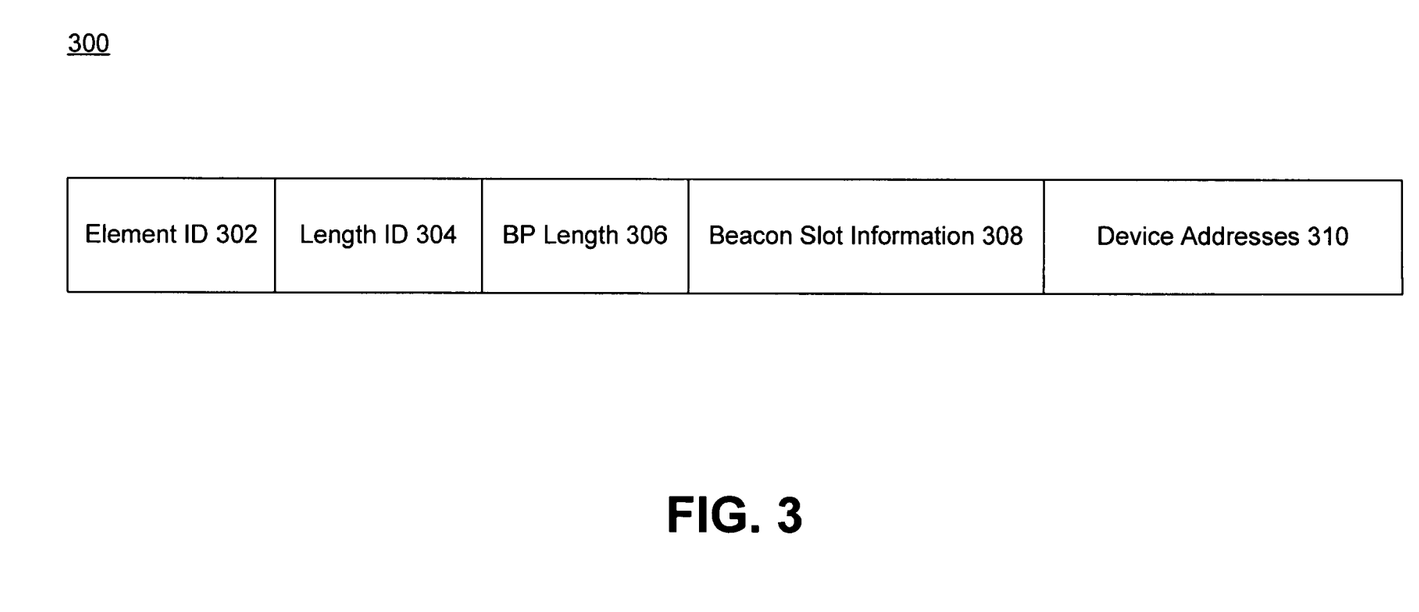
FIG. 3 is a diagram of a beacon period occupancy information element according to an embodiment of the present invention.

Beacons may contain various overhead or networking information. For instance, beacons may contain information regarding resource allocations and beaconing group configuration. Such information may be in the form of various information elements (IEs). One such IE is the beacon period occupancy IE (BPOIE). Devices transmit BPOIEs in their beacons to provide information regarding the beacon period that they observe. FIG. 3 is diagram of an exemplary BPOIE 300, according to an embodiment of the present invention. As shown in FIG. 3, BPOIE 300 includes various fields. These fields include an element ID field 302, a length field 304, a BP length field 306, a beacon slot information field 308, and device address fields 310.

Element ID field 302 identifies this information element as a BPOIE. Length field 304 indicates the length of BPOIE 300. BP length field 306 conveys the length of the beacon period in the number of beacon slots from the transmitting device's perspective. Beacon slot information field 308 consists of multiple 2-bit elements to indicate the beacon slot occupancy and movability within beacon period. Device address fields 310 correspond to beacon slots that are encoded as occupied by field 308. In particular, these fields provide device addresses for each of the occupied beacon slots.

Referring again to FIG. 2, data transfer periods 206 are used for devices to communicate data according to, for example, frequency hopping techniques that employ OFDM and/or TFCs. For instance, data transfer periods 206 may support data communications across links 120 and 122. In addition, devices (e.g., DEVs 102a-e) may use data transfer periods 206 to transmit control information, such as request messages to other devices. To facilitate the transmission of traffic, each DEV may be assigned a particular time slot within each data transfer period 206. In the context of the MBOA MAC specification, these time slots are referred to as media access slots (MASs).

A MAS is a period of time within a data transfer period 206 in which two or more devices are protected from contention access by devices acknowledging the reservation. MASs may be allocated by a distributed protocol, such as the distributed reservation protocol (DRP). Alternatively, resources may be allocated by the prioritized contention access (PCA) protocol. Unlike DRP, PCA isn't constrained to reserving one or more entire MASs. Instead, PCA can be used to allocate any part of the superframe that is not reserved for beaconing or DRP reservations.

II. Beacon Slot Acquisition

Figure 4:
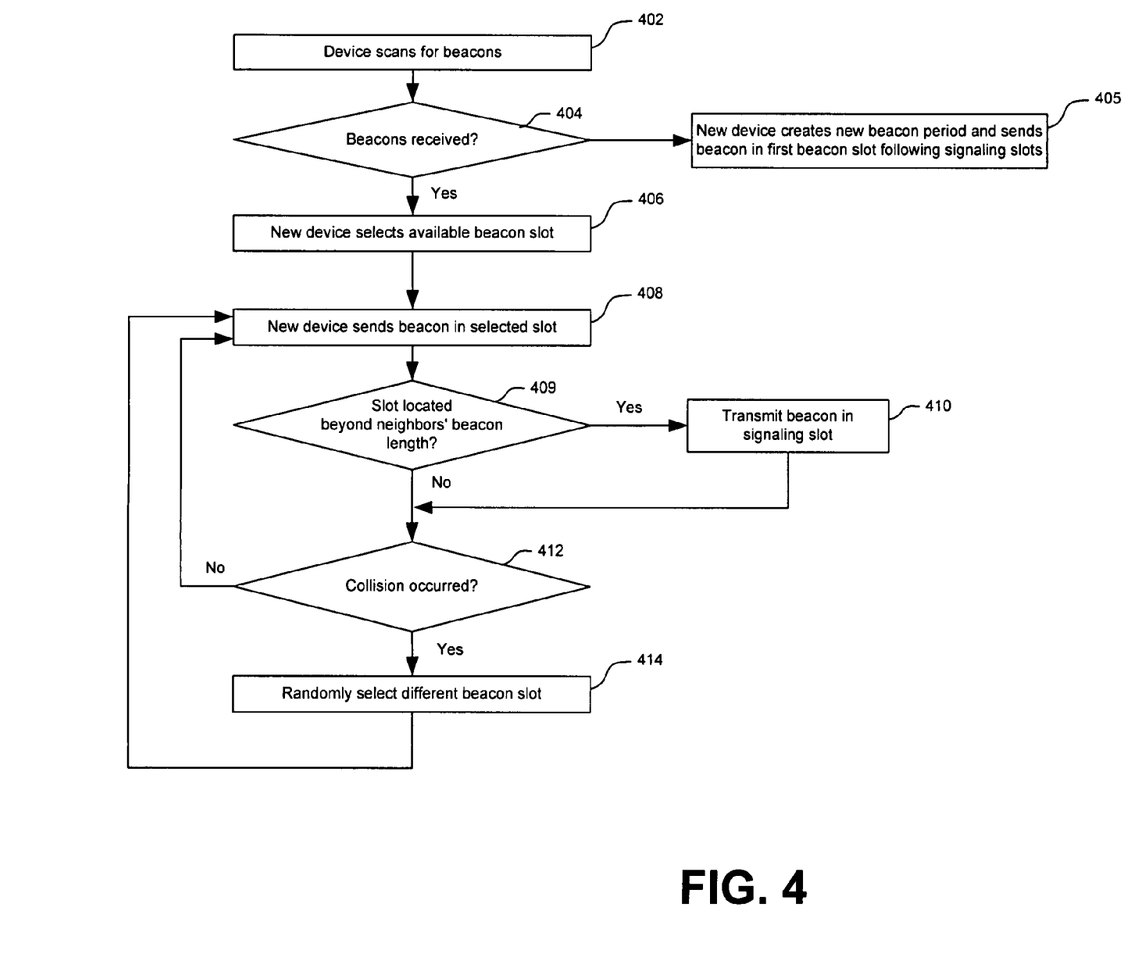
FIG. 4 is a flowchart of a typical beacon acquisition process according to embodiments of the present invention.

FIG. 4 is a flowchart of an operational sequence according to embodiments of the present invention. This sequence involves the acquisition of a beacon slot by a device. As shown in FIG. 4, this sequence includes a step 402, in which the device scans for beacons over a predetermined number (e.g., one or more) superframes.

As indicated by a step 404, operation proceeds to a step 405 if the device receives no beacon frames in step 402. Otherwise operation proceeds to a step 406 in which the device selects a beacon slot. This selected slot is any beacon slot after the highest numbered unavailable beacon slot the device observed in step 402 and within the maximum beacon period length announced by any of the neighboring devices in the beaconing group. Accordingly, in a step 408, the device transmits a beacon in the slot selected in step 406

As indicated by a step 409, if the selected beacon slot is located beyond the beacon period length of any of the device's neighbors, then a step 410 is performed. In this step, the device also transmits the beacon (except for a beacon slot number field) in a signaling beacon slot that it randomly chooses.

As shown in FIG. 4, a step 412 is performed in which the device determines whether a collision occurred in the transmission of its beacon. If so, then a step 414 is performed in which the device randomly chooses a different beacon slot for its subsequent beacon transmissions. This different beacon slot is located after the highest numbered unavailable beacon slot observed in step 402. Upon completion of steps 412 and/or 414, operation returns to step 408 for the continued transmission of beacons.

As described above, operation proceeds to step 405 if the device does not receive any beacon transmissions in step 402. In step 405, the device creates a new beacon period and sends a beacon in the first beacon slot that follows the signaling slots.

In the operational sequence of FIG. 4, the device changes its selected beacon slot if a collision occurs. However, a device may not always be able to detect such a collision. This inability may be attributed to various reasons, such as device coverage areas that do not completely overlap.

Figure 5:
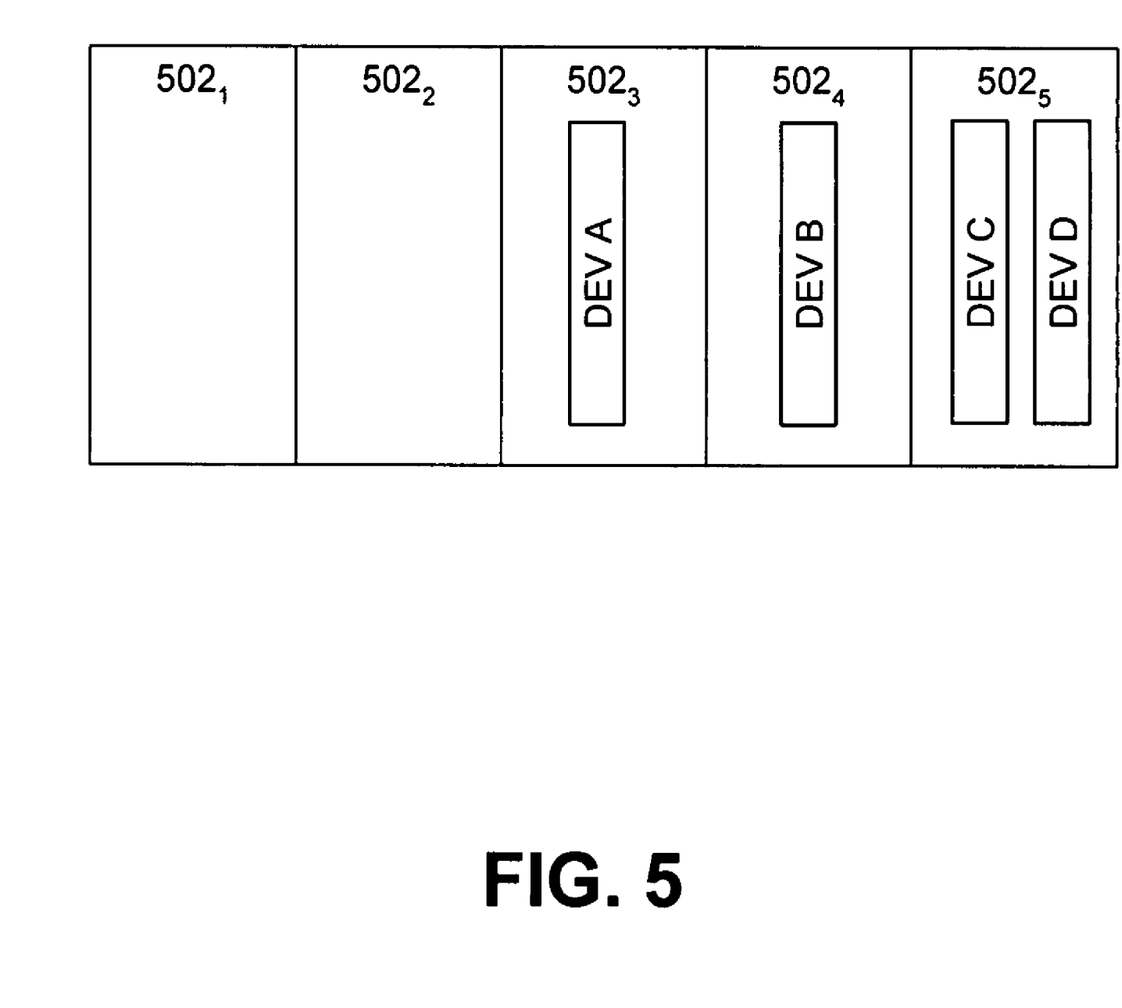
FIGS. 5 and 6 are diagrams of exemplary beacon acquisition scenarios according to embodiments of the present invention.

FIG. 5 is a diagram of an exemplary scenario in which two devices contend for the same beacon slot. This scenario involves four devices (DEV A, DEV B, DEV C, and DEV D) and five beacon slots (slots $502_1$, $502_2$, $502_3$, $502_4$, and $502_5$). FIG. 5 shows that, in this scenario, DEV A occupies beacon slot $502_3$, and DEV B occupies beacon slot $502_4$. Slot $502_4$ is also the highest numbered beacon slot that is unavailable. Thus, devices attempting to acquire a beacon slot will select slot $502_5$.

Accordingly, DEV C and DEV D attempt to acquire beacon slot $502_5$ during the same superframe. Due to these simultaneous attempts, the beacon transmissions collide. As a result, neither DEV A nor DEV B will be able to receive these beacon transmissions. Also, neither DEV A nor DEV B will be able to announce the presence of DEV C or D in their BPOIEs during the subsequent superframe. However, at this point DEV C and DEV D do not know whether a collision occurred or whether these devices simply failed to receive their beacon transmissions. Unfortunately, this contention situation may continue. In high demand situations involving many devices attempting to join a beaconing group, such situations could create contention bottlenecks.

In events where either or both of DEV A and DEV B is able to detect some transmission in the available beacon slot, the device(s) may announce on their subsequent BPOIE's that the slot is reserved, by using a dedicated broadcast ID (also referred to as BsctAddr). In such circumstances, the announcing device reserves one or more beacon slots as available beacon slots after the beacon slot reserved for the broadcast ID. However, it should be noted that in order to optimize the communication throughput and energy consumption of the devices within a beacon group, it is desirable to keep the number of available beacon slots small generally. Therefore, DEV C and DEV D will again have to make the same competition for the one or more available beacon slots. This once more presents a possibility that their subsequent beacon transmissions will collide.

Figure 6:
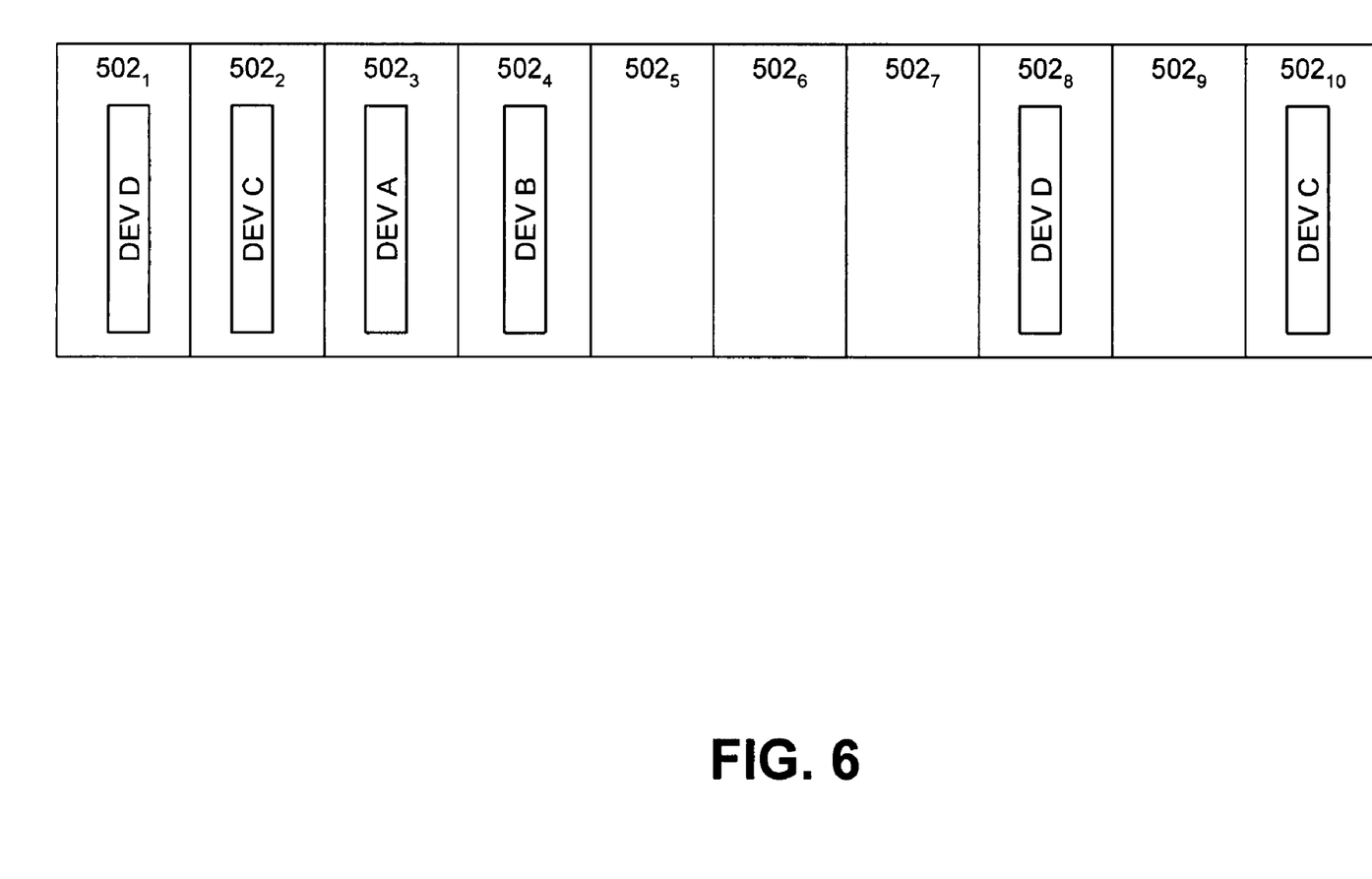

To overcome such problematic events, the present invention provides a mechanism for handling and resolving beacon slot contention. FIG. 6 is a diagram of an exemplary scenario according to an embodiment of the present invention. In this scenario, the contention described with reference to FIG. 5 is resolved. For instance, either or both of DEV C and DEV D may assume that a collision has occurred after a predetermined number of superframes without being announced in a BPOIE. Accordingly, either or both of DEV C and DEV D may select (e.g., through a random process) a beacon slot that is greater than slot $502_5$. For instance, DEV C selects a slot $502_{10}$ and DEV D selects a slot $502_8$.

In addition, each of these devices (through random selection) transmit their beacons using signaling slots $502_1$ and $502_2$. This signals to DEV A and DEV B that the beacon period length has increased. When these devices randomly select the signaling slot, there is a chance that the signaling slot beacons may also collide. However, the current MBOA MAC specification requires that the BP length become extended by a predetermined number of slots (by the mBPErrorExtension parameter of 8 slots) when an attempt of a beacon (an invalid checksum) is detected in a signaling slot.

The scenario of FIGS. 5 and 6 are shown for purposes of illustration and not limitation. Accordingly, it should be noted that according to various embodiments there may be more than one available beacon slot at any time. Further, according to an alternative embodiment, there may no available beacon slots at any time. In any case, the present invention provides means for reducing beacon slot acquisition time whenever there are two or more colliding beacon transmissions on available beacon slots.

Figure 7:
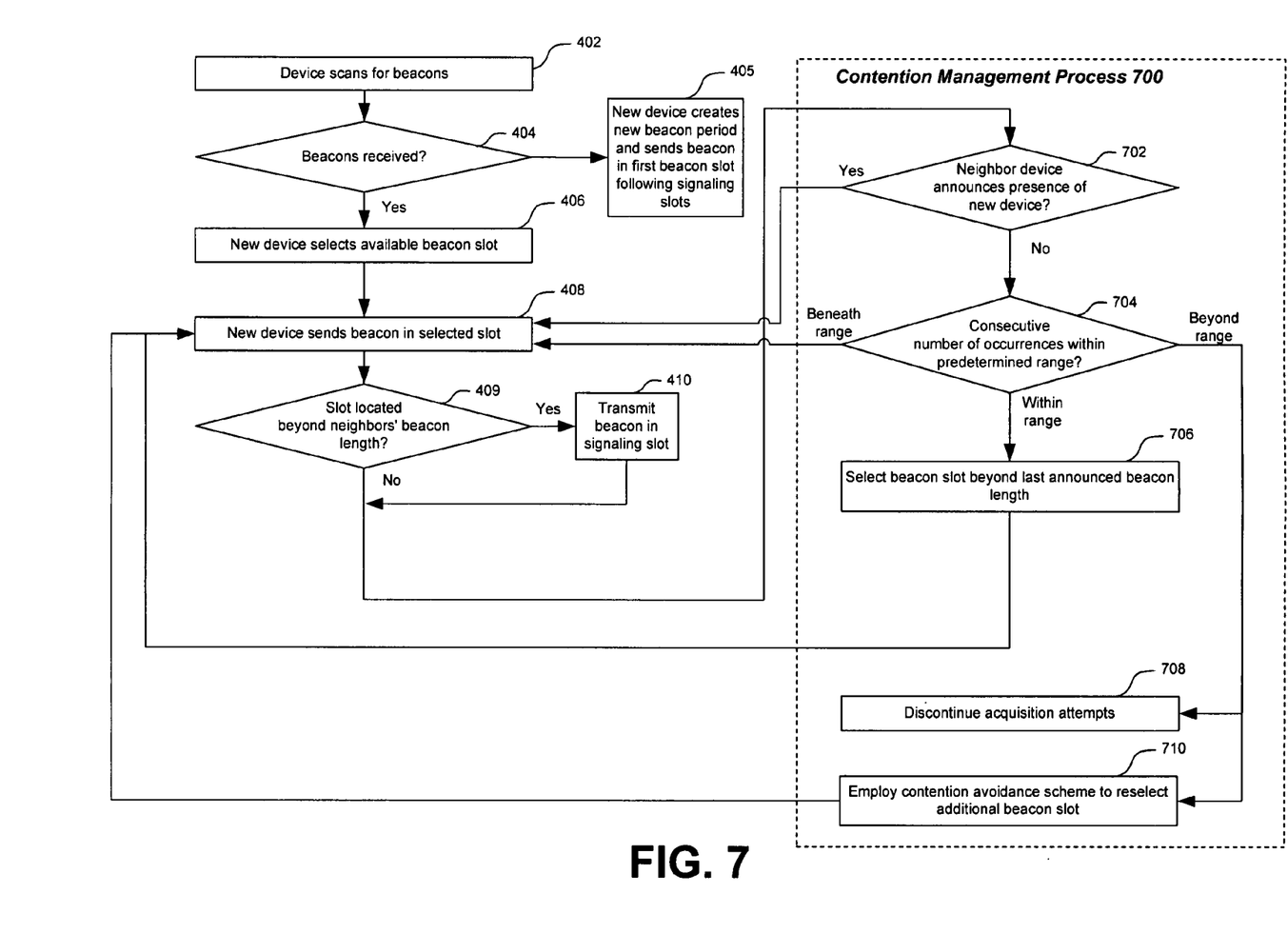
FIG. 7 is a flowchart of a beacon acquisition process employing contention management according to an embodiment of the present invention.

Consistent with the above technique, FIG. 7 is a flowchart of an operational sequence of a device involving the acquisition of a beacon slot. This sequence is similar to the sequence of FIG. 4. However, in FIG. 7, steps 412 and 414 have been replaced by a contention management process 700.

As shown in FIG. 7, contention management process includes a step 702. In this step, the device determines whether any neighboring devices have announced the presence of the device. Such announcements may be in the form of BPOIEs indicating the device's use of a particular beacon slot.

If such an announcement has been made, operation proceeds to step 408 in which the device continues to transmit beacons in its previously selected beacon slot. However, if such an announcement has not been made, the device may select a different beacon slot or discontinue its attempts to acquire a beacon slot. Such determinations may be based on various factors. For instance, in embodiments, the device determines the consecutive number of times (i.e., the consecutive number of superframes) that it has not received an announcement of its presence.

Accordingly, as indicated by a step 704, the device determines the consecutive number of times that it has failed to receive such an announcement. If this consecutive number of times falls short of a predetermined range, then operation returns to step 408 in which the device continues to transmit beacons in its previously selected beacon slot or selects a free beacon slot after the previously selected beacon slot within last announced beacon period length in situations where the previously selected beacon is reserved. Alternatively, if this consecutive number of times is within a predetermined range, then the device assumes that a collision has occurred and operation proceeds to a step 706.

In step 706, the device selects a new beacon slot that is beyond the last announced beacon period length. As described above, such lengths may be announced in neighboring devices' BPOIEs. As shown in FIG. 7, step 408 follows step 706 in which the device transmits its beacon during the newly selected beacon slot. In this case, the device will also (according to step 410) transmit its beacon in a signaling slot because the slot chosen in step 706 was beyond the last announced beacon length. As described previously in connection with FIG. 3, the BPOIE includes beacon slot information. This information indicates to other devices that the beacon period length has been extended as the new beacon slot is beyond the last announced beacon period length. Further, as indicated previously, even in situations where there is a collision between beacon transmissions in signaling slots, any device that detects an attempt of beacon transmission in signaling slots shall listen for a maximum time (also referred to as mBPErrorExtension).

As described above, the device may stop trying to acquire a beacon slot. For instance, FIG. 7 shows that the device may perform a step 708 if it determines in step 704 that the consecutive number of times an announcement of its presence has not been received is greater than the predetermined range. Accordingly, in step 708, the device discontinues its attempts to acquire a beacon slot. Moreover, in this step, the device may communicate to its upper protocol layers that communications are not currently possible.

As an alternative to step 708, a step 710 may be performed. In this step, the device may apply a collision detection scheme and try to select another slot from the available slots. If successful, then operation proceeds to step 408.

III. Device Implementation

Figure 8:
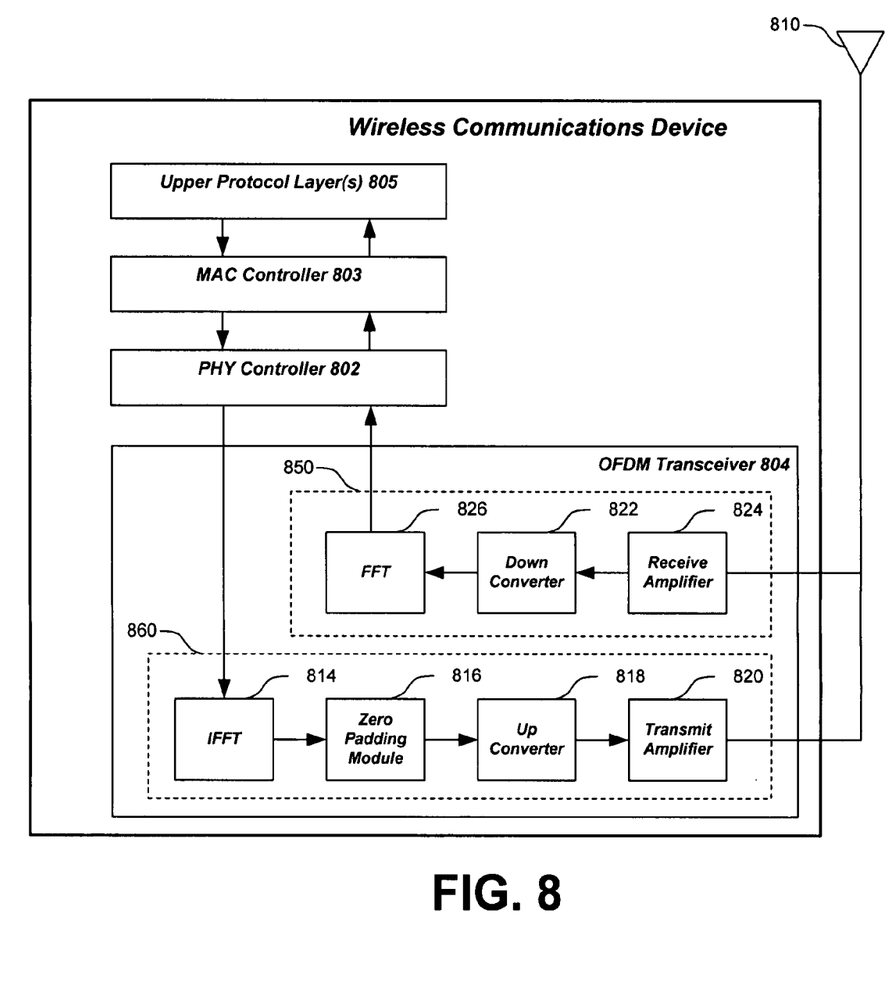
FIG. 8 is a block diagram of an exemplary wireless communications device architecture, according to embodiments of the present invention.

FIG. 8 is a block diagram of a wireless communications device 800 with MBOA capabilities. As shown in FIG. 8, device 800 includes a physical layer (PHY) controller 802, a media access controller (MAC) 803, an OFDM transceiver 804, and upper protocol layer(s) 805. In addition, device 800 includes an antenna 810.

MAC controller 803 generates frames (data transmissions) and beacons for wireless transmission. In addition, MAC controller 803 receives and processes frames and beacon transmissions that are originated from remote devices. MAC controller 803 exchanges these frames and beacon transmissions with PHY controller 802. In turn, PHY controller 802 exchanges frames and beacon transmissions with OFDM transceiver 804. Further, MAC controller 803 may operate to acquire beacon slots. For example, in embodiments, MAC controller 803 may perform steps of FIGS. 4 and 7.

OFDM transceiver is used to send and receive MBOA transmissions. FIG. 8 shows that OFDM transceiver 804 includes a receiver portion 850 and a transmitter portion 860. Transmitter portion 860 includes an inverse fast fourier transform (IFFT) module 814, a zero padding module 816, an upconverter 818, and a transmit amplifier 820. IFFT module 814 receives frames for transmission from PHY controller 802. For each of these frames, IFFT module 814 generates an OFDM modulated signal. This generation involves performing one or more inverse fast fourier transform operations. As a result, this OFDM modulated signal includes one or more OFDM symbols. This signal is sent to zero padding module 816, which appends one or more "zero samples" to the beginning of each OFDM symbol to produce a padded modulated signal. Upconverter 818 receives this padded signal and employs carrier-based techniques to place it into one or more frequency bands. These one or more frequency bands are determined according to a frequency hopping pattern, such as one or more of the TFCs. As a result, upconverter 818 produces a frequency hopping signal, which is amplified by transmit amplifier 820 and transmitted through antenna 810.

FIG. 8 shows that receiver portion 850 includes a downconverter 822, a receive amplifier 824, and a fast fourier transform (FFT) module 826. These components (also referred to as a receiver) are employed in the reception of wireless signals from remote devices. In particular, antenna 810 receives wireless signals from remote devices that may employ frequency hopping patterns, such as one or more of the TFCs. These signals are sent to amplifier 824, which generates amplified signals. Amplifier 824 sends the amplified signals to downconverter 822. Upon receipt, downconverter 822 employs carrier-based techniques to convert these signals from its one or more frequency hopping bands (e.g., TFC bands) into a predetermined lower frequency range. This results in modulated signals, which are received by FFT module 826, which performs OFDM demodulation on these signals. This demodulation involves performing a fast fourier transform for each symbol that is conveyed in the amplified signals.

As a result of this demodulation, FFT module 826 produces one or more frames, which are sent to PHY controller 802. These frames may convey information, such as payload data and protocol header(s). Upon receipt, PHY controller 802 processes these frames. This may involve removing certain PHY layer header fields, and passing the remaining portions of the frames to MAC controller 803.

As shown in FIG. 8, device 800 further includes one or more upper protocol layers 805. These layers may involve, for example, user applications. Accordingly, upper layers 805 may exchange information with remote devices. This involves layer(s) 805 exchanging protocol data units with MAC controller 803. In turn, MAC controller 803 operates with PHY controller 802 and transceiver 804 to transmit and receive corresponding wireless signals.

The device of FIG. 8 may be implemented in hardware, software, firmware, or any combination thereof. For instance, within OFDM transceiver 804, upconverter 818, transmit amplifier 820, receive amplifier 824, and downconverter 822 may include electronics, such as amplifiers, mixers, and filters. Moreover, implementations of device 800 may include digital signal processor(s) (DSPs) to implement various modules, such as scanning module 806, IFFT module 814, zero padding module 816, and FFT module 826. Moreover, in embodiments of the present invention, processor(s), such as microprocessors, executing instructions (i.e., software) that are stored in memory (not shown) may be used to control the operation of various components in these devices. For instance, components, such as PHY controller 802 and MAC controller 803, may be primarily implemented through software operating on one or more processors.

Figure 9:
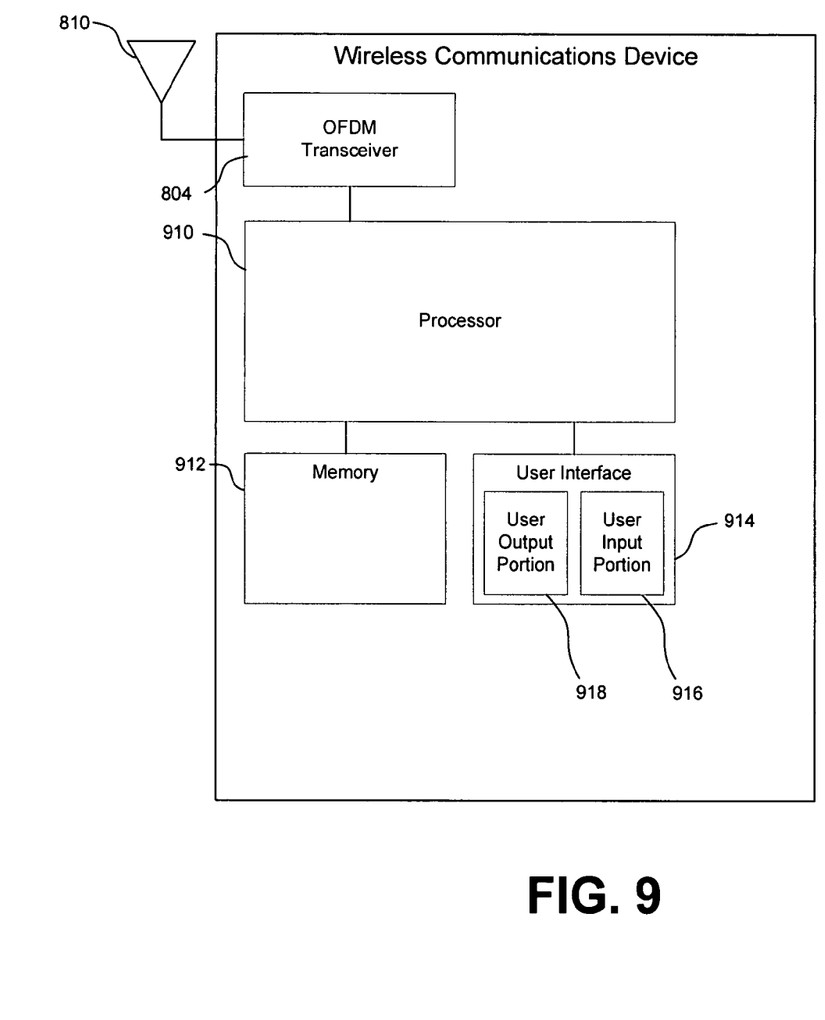
FIG. 9 is a diagram of an exemplary wireless communications device implementation, according to an embodiment of the present invention.

One such implementation of device 900 is shown in FIG. 9. As shown in FIG. 9, this implementation includes a processor 910, a memory 912, and a user interface 914. In addition, the implementation of FIG. 9 includes OFDM transceiver 804 and antenna 810. These components may be implemented as described above with reference to FIG. 8. However, the implementation of FIG. 9 may be modified to include different transceivers that support other wireless technologies.

Processor 910 controls device operation. As shown in FIG. 9, processor 910 is coupled to transceiver 804. Processor 910 may be implemented with one or more microprocessors that are each capable of executing software instructions stored in memory 912, for example, as a computer system.

Memory 912 includes random access memory (RAM), read only memory (ROM), and/or flash memory, and stores information in the form of data and software components (also referred to herein as modules). These software components include instructions that can be executed by processor 910. Various types of software components may be stored in memory 912. For instance, memory 912 may store software components that control the operation of transceiver 804. Also, memory 912 may store software components that provide for the functionality of PHY controller 802, MAC controller 803, and upper protocol layer(s) 805.

In addition, memory 912 may store software components that control the exchange of information through user interface 914. As shown in FIG. 9, user interface 914 is also coupled to processor 910. User interface 914 facilitates the exchange of information with a user. FIG. 9 shows that user interface 914 includes a user input portion 916 and a user output portion 918.

User input portion 916 may include one or more devices that allow a user to input information. Examples of such devices include keypads, touch screens, and microphones. User output portion 918 allows a user to receive information from the device. Thus, user output portion 918 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 9 may be coupled according to various techniques. One such technique involves coupling transceiver 804, processor 910, memory 912, and user interface 914 through one or more bus interfaces. In addition, each of these components is coupled to a power source, such as a removable and/or rechargeable battery pack (not shown).

IV. Conclusion

While various embodiments of the present invention have been described above, it should be understood that they have been presented by way of example only, and not in limitation. For instance, although examples have been described involving MBOA communications, other short-range and longer-range communications technologies are within the scope of the present invention. Moreover, the techniques of the present invention may be used with signal transmission techniques other than OFDM.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a wireless communications device, comprising:
    (a) detecting one or more beacons in a beacon period of a repeating time interval comprising the beacon period and a data transfer period;
    (b) selecting a first beacon slot in the beacon period, wherein the first beacon slot is selected from among a predefined number of beacon slots beyond a last detected beacon and within a maximum number of beacon slots within the beacon period; and
    (c) transmitting beacons of the wireless communications device, both during said first beacon slot and also during one of two or more dedicated signaling slots occurring in the beginning of the same beacon period, said signaling slots dedicated for indicating change in beacon period length, the length of the beacon period being a number of beacon slots last announced by neighboring devices, by said predefined number of beacon slots within the beacon period.

2. The method of claim 1, wherein the beacon period is an MBOA superframe.

3. The method of claim 1, wherein the predefined number of beacon slots beyond the last detected beacon is defined by a mBPErrorExtension parameter.

4. The method of claim 1, wherein the predefined number of beacon slots beyond the last detected beacon is eight beacon slots.

5. The method of claim 1, wherein the signaling slots are within two first occurring beacon slots of the beacon period.

6. A method in a wireless communications device, comprising:
    (a) detecting one or more beacons in a beacon period of a repeating time interval comprising the beacon period and a data transfer period;
    (b) selecting a first beacon slot in the beacon period, wherein the first beacon slot is selected from among a predefined number of beacon slots beyond a last detected beacon and within a maximum number of beacon slots within the beacon period;
    (c) transmitting beacons of the wireless communications device during the first beacon slot;
    (d) determining whether a collision has occurred in the first beacon slot;
    (e) if a collision in the first beacon slot is detected, selecting a second beacon slot within the beacon period; and
    (f) transmitting beacons of the wireless communications device, both during said second beacon slot and also during one of two or more dedicated signaling slots occurring in the beginning of the same beacon period, said signaling slots dedicated for indicating change in beacon period length, the length of the beacon period being a number of beacon slots last announced by neighboring devices, by said predefined number of beacon slots within the beacon period.

7. The method of claim 6, wherein the beacon period is an MBOA superframe.

8. The method of claim 6, wherein the predefined number of beacon slots from among the first beacon slot is selected is defined by a mBPErrorExtension parameter.

9. The method of claim 6, wherein the predefined number of beacon slots from among the first beacon slot is selected is eight beacon slots.

10. The method of claim 6, further comprising transmitting beacons of the wireless communications device also during one of two or more signaling slots dedicated for indicating change in a number of beacon slots within the beacon period.

11. The method of claim 10, wherein the signaling slots dedicated for indicating change in the number of beacon slots within the beacon period comprise two first occurring beacon slots of the beacon period.

12. An apparatus, comprising:
    a controller configured to detect one or more beacons in a beacon period of a repeating time interval comprising the beacon period and a data transfer period, and to select a first beacon slot in the beacon period, wherein the first beacon slot is selected from among a predefined number of beacon slots beyond a last detected beacon and within a maximum number of beacon slots within the beacon period; and
    a transceiver configured to transmit beacons of the apparatus, both during said first beacon slot and also during one of two or more dedicated signaling slots occurring in the beginning of the same beacon period, said signaling slots dedicated for indicating change in beacon period length, the length of the beacon period being a number of beacon slots last announced by neighboring devices, by said predefined number of beacon slots within the beacon period.

13. The apparatus of claim 12, wherein the beacon period is an MBOA superframe.

14. The apparatus of claim 12, wherein the signaling slots are within two first occurring beacon slots of the beacon period.

15. An apparatus, comprising:
 a controller configured to detect one or more beacons in a beacon period of a repeating time interval comprising the beacon period and a data transfer period, and to select a first beacon slot in the beacon period, wherein the first beacon slot is selected from among a predefined number of beacon slots beyond a last detected beacon and within a maximum number of beacon slots within the beacon period; and
 a transceiver configured to transmit beacons of the apparatus during the first beacon slot;
 wherein the controller is further configured to:
  (i) determine whether a collision has occurred in the first beacon slot;
  (ii) if a collision in the first beacon slot is detected, select a second beacon slot within the beacon period;
  (iii) transmit beacons of the apparatus, both during said second beacon slot and also during one of two or more dedicated signaling slots occurring in the beginning of the same beacon period, said signaling slots dedicated for indicating change in beacon period length, the length of the beacon period being a number of beacon slots last announced by neighboring devices, by said predefined number of beacon slots within the beacon period.

16. The apparatus of claim 15, wherein the transceiver is further configured to transmit beacons of the apparatus also during one of two or more signaling slots dedicated for indicating change in a number of beacon slots within the beacon period.

17. The apparatus of claim 16, wherein the signaling slots dedicated for indicating change in the number of beacon slots within the beacon period comprise two first occurring beacon slots of the beacon period.

18. A computer program product comprising a non-transitory computer useable medium having computer program logic recorded thereon for enabling a processor in a computer system to control a wireless communications device, the computer program logic comprising:
 program code for detecting one or more beacons in a beacon period of a repeating time interval comprising the beacon period and a data transfer period; program code for selecting a first beacon slot in the beacon period, wherein the first beacon slot is selected from among a predefined number of beacon slots beyond a last detected beacon and within a maximum number of beacon slots within the beacon period; and
 program code for transmitting beacons of the wireless communications device, both during said first beacon slot and also during one of two or more dedicated signaling slots occurring in the beginning of the same beacon period, said signaling slots dedicated for indicating change in beacon period length, the length of the beacon period being a number of beacon slots last announced by neighboring devices, a number of beacon slots by said predefined number of beacon slots within the beacon period.

19. A computer program product comprising a non-transitory computer useable medium having computer program logic recorded thereon for enabling a processor in a computer system to control a wireless communications device, the computer program logic comprising:
 program code for detecting one or more beacons in a beacon period of a repeating time interval comprising the beacon period and a data transfer period;
 program code for selecting a first beacon slot in the beacon period, wherein the first beacon slot is selected from among a predefined number of beacon slots beyond a last detected beacon and within maximum number of beacon slots within the beacon period;
 program code for transmitting beacons of the wireless communications device during the first beacon slot;
 program code for determining whether a collision has occurred in the first beacon slot;
 program code for, if a collision in the first beacon slot is detected, selecting a second beacon slot within the beacon period; and
 program code for transmitting beacons of the wireless communications device, both during said second beacon slot and also during one of two or more dedicated signaling slots occurring in the beginning of the same beacon period, said signaling slots dedicated for indicating change in beacon period length, the length of the beacon period being a number of beacon slots last announced by neighboring devices, a number of beacon slots by said predefined number of beacon slots within the beacon period.

20. The computer program product of claim 19, further comprising program code for transmitting beacons of the wireless communications device also during one of two or more signaling slots dedicated for indicating change in a number of beacon slots within the beacon period.

21. The computer program product of claim 20, wherein the signaling slots dedicated for indicating change in the number of beacon slots within the beacon period comprise two first occurring beacon slots of the beacon period.

* * * * *